Patented Aug. 3, 1937

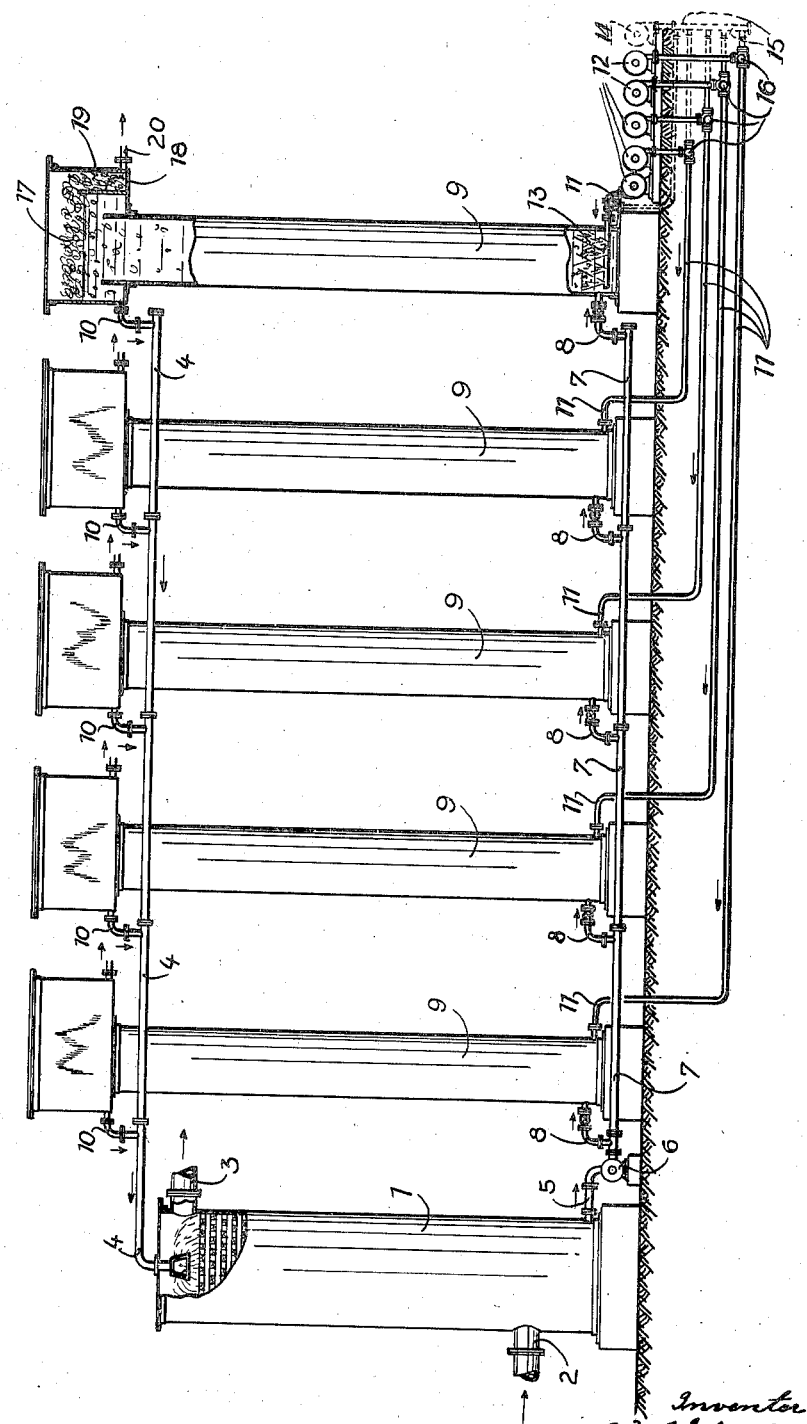

2,088,814

UNITED STATES PATENT OFFICE 2,088,814

APPARATUS FOR REMOVAL OF SULPHUR COMPOUNDS AND OTHER IMPURITIES FROM GASES BY MEANS OF A WET PROCESS

Adolf Schmalenbach, Essen-on-the-Ruhr, Germany, assignor, by mesne assignments, to Koppers Company, Pittsburgh, Pa., a corporation of Delaware Application December 11, 1935, Serial No. 53,985
In Germany February 5, 1934

2 Claims. (Cl. 23—260)

The invention relates to the removal of sulphur compounds and other impurities from gases, more particularly coal distillation gases, in plants in which the gas is treated with washing liquid which contains materials enabling the said sulphur compounds to be absorbed whilst forming compounds from which the effective initial compounds can be regained through a treatment with oxidizing gases such as air at increased pressure in a towerlike apparatus.

The device to carry out this so called wet gas cleaning consists as a rule of a washing tower provided with wooden lattices or the like with which the gases to be cleaned are brought into contact with the washing liquid. In addition to this washing tower the gas cleaning plant comprises one or more so called regenerating towers in which the washing liquid charged with the impurities to be absorbed is submitted to a treatment with oxidizing gases for example air.

The air is introduced at the base of these regenerating towers which are usually completely full of liquid and preferably in as finely divided state as possible in order that there shall be a large area of contact which is favourable for the reaction between the air and liquid. As a rule however, several regenerating towers are provided for each washing tower. In this way it is possible to adapt the regenerating process exactly in accordance with the existing charge in the plant. In addition the use of regenerating towers of not too large diameter improves the regenerating process and the separation of elementary sulphur undertaken simultaneously with the regeneration in most wet gas purifying processes.

In the operation of such wet gas purifying plants in which several regenerating towers are used simultaneously for regenerating the liquid from one and the same washing tower or stage, it has been found that the regeneration does not extend uniformly in the different regeneration towers. Tests have shown that these irregularities and the periodic deterioration of the regenerating process can be traced back to a varying supply of regenerating air. In the case of purifying plants used hitherto all regenerating towers are connected by means of a collective connection to an apparatus for producing compressed air. By means of the collective connection the compressed air is distributed to the towers in accordance with the pressure which exists at the bottom of the individual regenerating towers. This pressure is however dependent on the weight of the column of liquid in the regenerating tower which again is dependent on the height of the column of liquid and the air contained in the liquid. As can be immediately understood the height of the column of liquid can be kept constant in all the regenerating towers by the arrangement of suitable overflows without any great difficulty. On the other hand the maintenance of a constant air content in the column of liquid presents great difficulties as the absorption capacity of the liquid for air and the degree of distribution of the air is dependent on definite factors (surface tension) which are difficult to control. It therefore happens that in the practical operation of wet gas purifying plants the distribution of the regenerating air to the total liquid content from the individual washing towers constantly varies and thus seriously decreases the efficiency of the regenerating process.

In order to combat this fluctuating air distribution with the use of several regenerating towers in a gas purifying plant, endeavours have been made to compress the regenerating air to a comparatively high pressure and to provide throttle devices for the compressed air at the inlets in the regenerating towers. In this way it is possible to provide a uniform distribution of the regenerating air to all regenerating towers for the liquid from the same washing stage on account of the high compression of the regenerating air; however, the entire washing and regenerating process is made considerably dearer and thus the use of wet gas purifying is in many cases uneconomical or less advantageous.

In order to avoid this disadvantage the present invention fundamentally provides that with wet gas purifying plants constructed with several regenerating towers for the liquid from one and the same washing tower or stage, each of the regenerating towers is connected with a special air compressor which is adjustable by itself, whilst the throttle device is omitted.

The use of this fundamental idea according to the invention has shown that a practically entirely uniform effect on the regenerating air of the washing liquid in various regenerating towers is produced without it being necessary for the regenerating device or the air distributing device to be constantly watched. Furthermore it has also been shown that the plant costs are more favourable than with the use of a common air compressor for all the regenerating towers. In addition the production of the regenerating air, which has a considerable lower pressure in accordance with the invention, requires lower operating costs than hitherto. Altogether the invention produces a considerable economic improvement in wet gas purifying.

It is known in the case of gas-purifying plants that are operated according to the so called Seabord process to provide several regenerating towers in which the liquid to be regenerated trickles downwards over wooden lattices without however completely filling the tower and is aerated by a flow of air introduced from below. However in these plants the disadvantages which are to be avoided according to the invention have not occurred as the air is supplied through the lattice washer at practically atmospheric pressure.

The drawing illustrates the device for the wet purification of gas according to the invention in side elevation.

The treatment of the gases to be purified with the washing liquid is carried out in the washing tower 1. The gas is supplied through pipes 2 to the washing tower and leads out at the upper end through the pipe 3.

The washing tower 1 is constructed in the known manner with wooden lattices, on which the washing liquid is distributed in a thin layer so that gas and liquid contact over a large surface.

An aqueous solution of sodium-arsenic-sulphur compounds may be used as a washing liquid as more clearly explained for example in the German specification No. 478,140. Such a solution absorbs hydrogen sulphide and other sulphur compounds whilst forming highly sulphurated sodium-arsenic-sulphur compounds from which the lower sulphurated initial compound can be recovered with the precipitation of elementary sulphur by means of treatment with oxidizing gases (air or other oxidizing gases under pressure).

This washing liquid is delivered to the cover of the washing tower through the pipe 4. The washing liquid collecting at the bottom of the washing tower flows through the pipe 5 to a pump 6 by which means it is distributed through the pipe 7 and the branch pipes 8 to the individual regenerating towers 9. As can be seen from the drawing the used washing liquid is supplied to the regenerators 9 at the bottom.

The liquid rises in the towers 9 and flows off at the top end of the same through the overflow pipe 10 into the pipe 4 leading to the washer 1.

At the bottom of each of the regenerating towers 9 a compressed air pipe 11 is provided and leads to a compressor or fan 12 individual thereto. Inside the regenerating tower there is also provided a suitable air distributing device 13, for example a perforated spiral tube. The air supplies to the individual regenerating towers 9 are independent of each other and each of the individual compressors 12 is adjustable.

In order to have a sufficient quantity of compressed air at disposal in the case of trouble during the operation of one of the compressors 12 a reserve compressor 14 is provided in addition to the compressor 12 and is connected by means of pipes 15 which are connected with pipes 11 with the interposition of a three way cock 16 or other suitable regulating device so that the reserve compressor 14 can be connected with any one of the pipes 11 of the regenerating towers, as desired.

The elementary sulphur separated out from the washing liquid in the regenerating towers rises in the towers as a more or less dense scum, and collects as shown at 17 on the surface of the liquid in the regenerating tower. From there the scum falls over the overflow 18 into the container 19 from which the pipe 20 leads to a filter or other suitable device in which the sulphur is separated from the liquid. The liquid is then conveyed back into the washing process. The sulphur obtained is either melted and if necessary purified by distillation or is dried and used in the form of a fine powder.

I have described my invention above with reference to one example of construction without limiting the invention to the above description. The invention may however be varied as desired within the scope of the following claims.

I claim:

1. Apparatus for the removal of sulphur compounds and other impurities from gases, more particularly coal distillation gases, by means of a wet process, comprising a washing tower chamber for treating the gases with a washing liquid, a plurality of regenerating towers each adapted to be completely filled by the washing liquid and in which the washing liquid may be brought into contact with regenerating gases, means for dividing and delivering the spent liquid from the washing chamber as portions individual to the respective regeneration towers, means for supplying regenerating gases individually to the respective regenerating towers at their lower ends, each regenerating tower near its bottom being provided with it own and separate gas compressor, and means for individually regulating the quantity of the compressed gas supplied from the individual gas compressors.

2. Apparatus according to claim 1 wherein in addition to the individual gas compressors required for the individual regenerating towers a further gas compressor is provided and adapted to be individually connected with the individual regenerating towers as required.

ADOLF SCHMALENBACH.